United States Patent
Ito

(10) Patent No.: US 10,719,975 B2
(45) Date of Patent: Jul. 21, 2020

(54) INFORMATION PROCESSING APPARATUS AND METHOD OF GENERATING THREE-DIMENSIONAL MODEL

(71) Applicant: CANON KABUSHIKI KAISHA, Tokyo (JP)

(72) Inventor: Hironao Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/891,530

(22) Filed: Feb. 8, 2018

(65) Prior Publication Data
US 2018/0240264 A1    Aug. 23, 2018

(30) Foreign Application Priority Data
Feb. 17, 2017  (JP) .................. 2017-028423

(51) Int. Cl.
| | |
|---|---|
| G06T 15/08 | (2011.01) |
| G06T 17/10 | (2006.01) |
| G06T 7/55 | (2017.01) |
| G06T 17/00 | (2006.01) |
| G06T 7/564 | (2017.01) |

(52) U.S. Cl.
CPC ............... *G06T 15/08* (2013.01); *G06T 7/55* (2017.01); *G06T 7/564* (2017.01); *G06T 17/00* (2013.01); *G06T 17/10* (2013.01); *G06T 2200/08* (2013.01)

(58) Field of Classification Search
CPC .......... G06T 7/55; G06T 17/10; G06T 15/08; G06T 7/564; G06T 17/00; G06T 2200/08
See application file for complete search history.

(56) References Cited

U.S. PATENT DOCUMENTS

| | | | |
|---|---|---|---|
| 5,781,194 A * | 7/1998 | Ponomarev | G06T 17/10 |
| | | | 345/424 |
| 2006/0066614 A1* | 3/2006 | Grau | G06K 9/00201 |
| | | | 345/423 |
| 2009/0160858 A1* | 6/2009 | Chen | G06T 17/005 |
| | | | 345/424 |

(Continued)

OTHER PUBLICATIONS

Shamos, Michael I., "Computational Geometry", Yale University (Year: 1978).*

(Continued)

*Primary Examiner* — William A Beutel
(74) *Attorney, Agent, or Firm* — Venable LLP

(57) ABSTRACT

An information processing apparatus that generates a three-dimensional model based on a plurality of camera images obtained using a plurality of cameras, performs: transforming, into two-dimensional coordinate points on a camera image, a plurality of representative coordinate points specified from one processing unit voxel of a plurality of processing unit voxels that are obtained by dividing a target three-dimensional space serving as a target of three-dimensional model generation; determining, by using transformation results of the plurality of representative coordinate points, a coordinate point on the camera image corresponding to an internal coordinate point of the one processing unit voxel; and generating the three-dimensional model based on the determined coordinate point on the camera image corresponding to the internal coordinate point of the one processing unit voxel.

19 Claims, 13 Drawing Sheets

(56) References Cited

U.S. PATENT DOCUMENTS

2010/0156901 A1* 6/2010 Park .................... G06T 15/205
345/420
2016/0343166 A1* 11/2016 Inoko ................... G06T 19/006

OTHER PUBLICATIONS

Waechter, et al. (Irina Waechter, et al., "Using flow information to support 3D vessel reconstruction from rotational angiography", Medical Physics 35.7: 3302-3316. John Wiley and Sons Ltd. (Year: 2008).*

Nasrin et al. (Roshnara Nasrin, et al., "Efficient 3D visual hull recognition based on marching cube algorithm", IEEE. Sponsored 2nd International Conference on Innovations in Information Embedded and Communication Systems, ICIIECS'15, Conf. Date Mar. 19-20, 2015, 6 pages) (Year: 2015).*

Moezzi, et al., "Virtual View Generation for 3D Digital Video," IEEE MultiMedia, vol. 4, No. 1, Jan.-Mar. 1997, pp. 18-26.

* cited by examiner

F I G. 1B
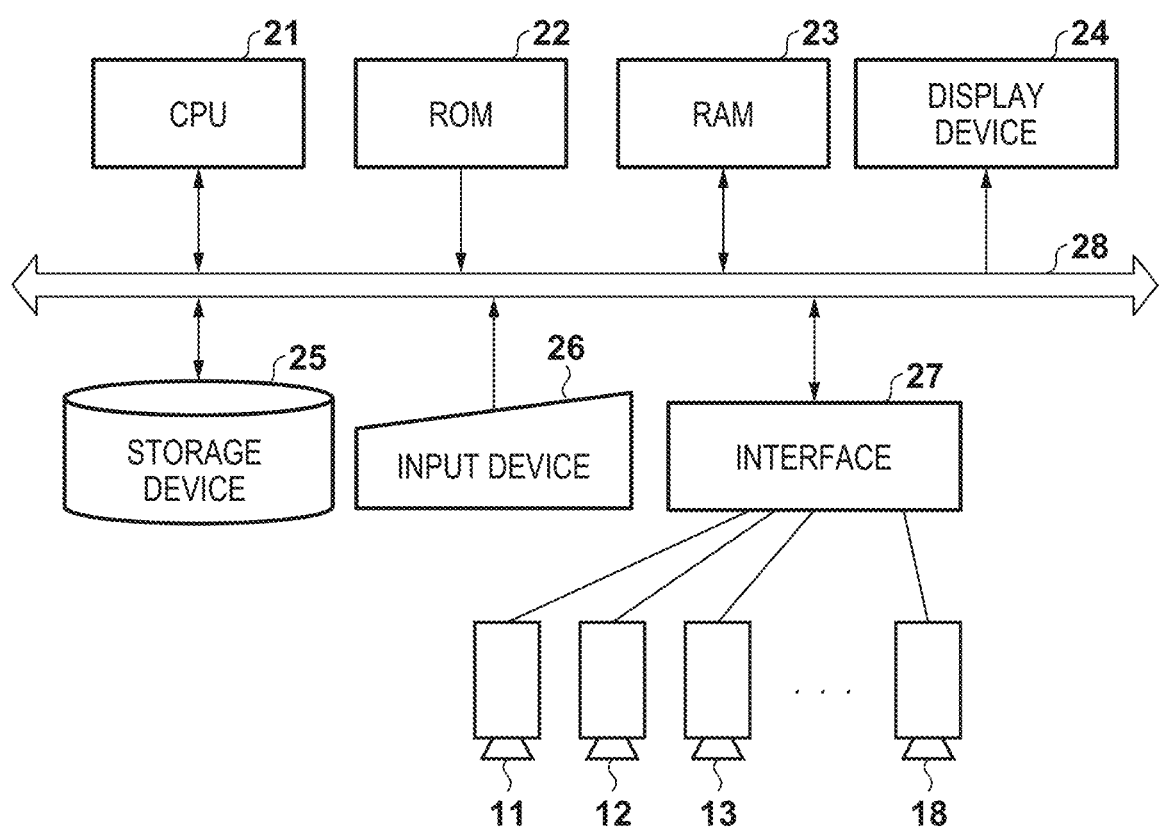

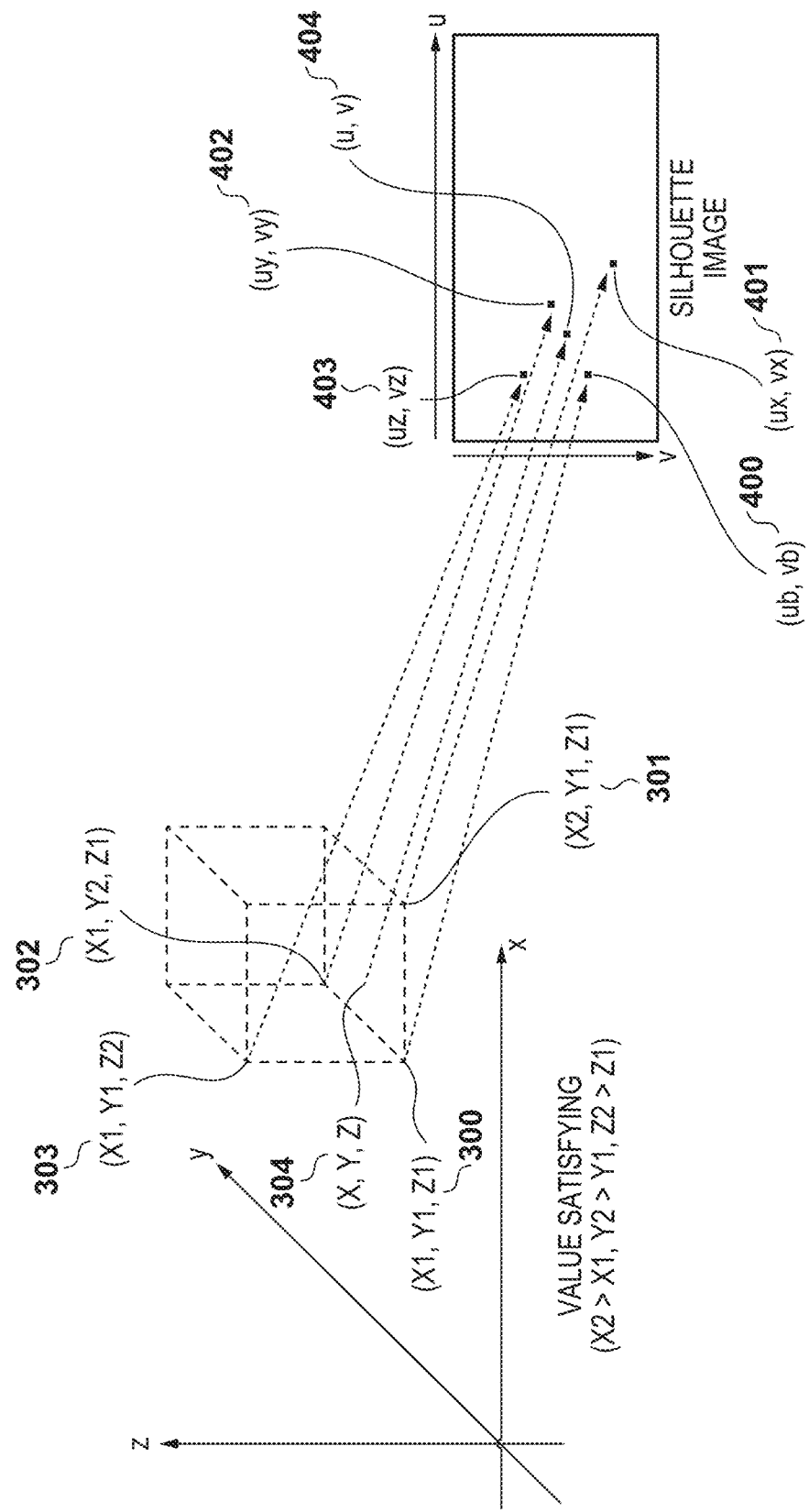

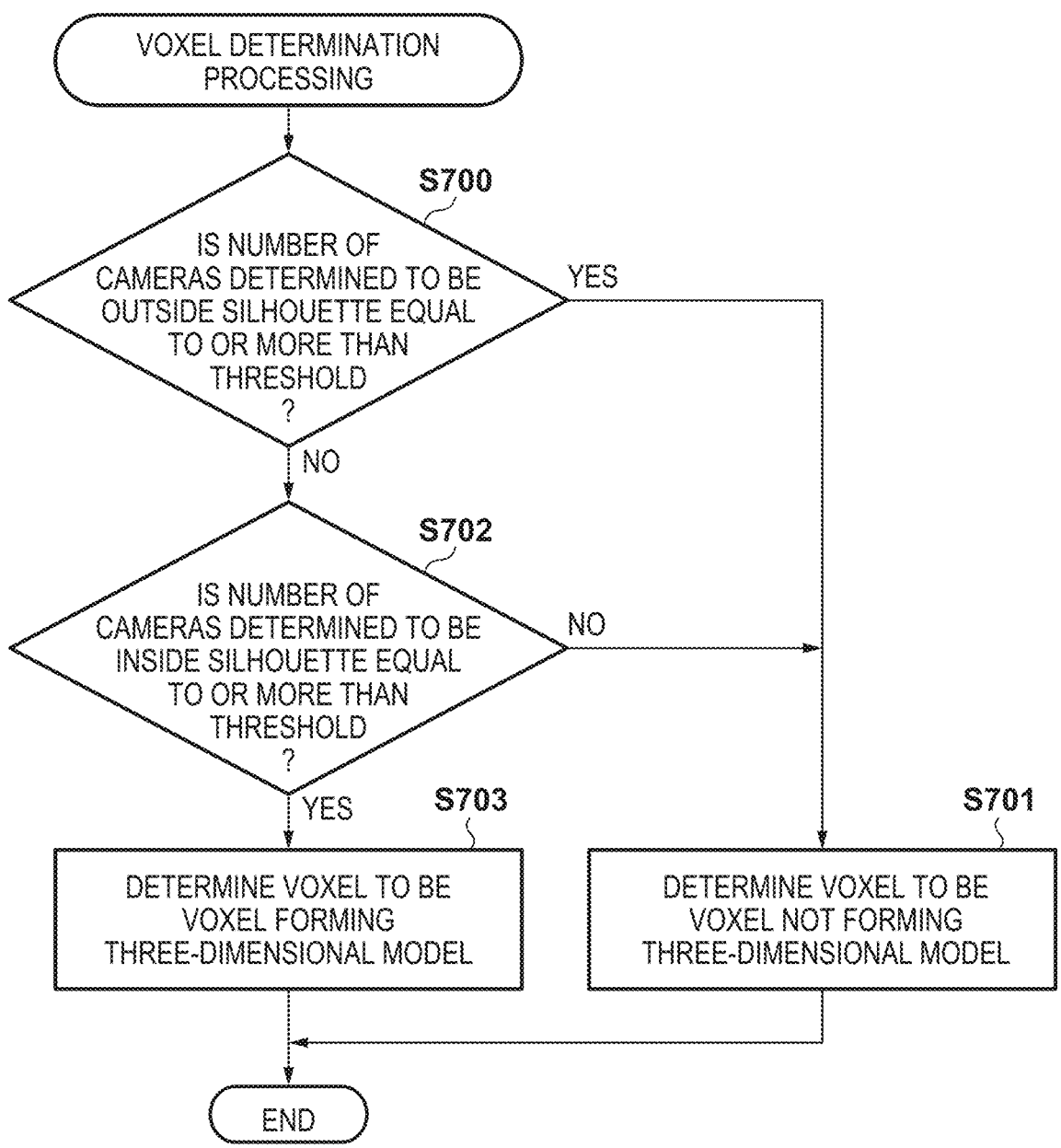

INFORMATION PROCESSING APPARATUS AND METHOD OF GENERATING THREE-DIMENSIONAL MODEL

BACKGROUND OF THE INVENTION

Field of the Invention

The present invention relates to an information processing apparatus that generates a three-dimensional model based on images obtained from a plurality of cameras and a method of generating a three-dimensional model.

Description of the Related Art

As a method of generating a three-dimensional model, the volume intersection method is known. In "Virtual View Generation for 3D Digital Video" (IEEE MULTIMEDIA Vol. 4 No. 1 pp. 18-26, 1997), a measurement target space shot by a plurality of cameras is divided into small cubes or cuboids (to be referred to as voxels hereinafter). Furthermore, each voxel is geometrically transformed and projected onto a camera image, and it is determined whether the voxel is inside the silhouette of a modeling target object in the camera image. If it is determined that the voxel is inside the silhouette in all of the camera images, the voxel is registered as a voxel forming the target object. When the determination is completed for each voxel, the voxels that have been registered as voxels forming the target object are output as a three-dimensional model.

However, when voxels are to be geometrically transformed and to be projected onto each camera image in the manner shown in "Virtual View Generation for 3D Digital Video" (IEEE MULTIMEDIA Vol. 4 No. 1 pp. 18-26, 1997), it requires an extremely large calculation load as it will be described below. Hence, it needs an extremely long time to generate a model. In addition, the cost of the apparatus increases when a model is to be generated at high speed.

Assume that the three-dimensional space of the measurement target space is a world coordinate system, and the optical-axis direction of a camera is the z-axis, the vertically upward direction of the camera is the y-axis, and the right hand direction of the camera is the x-axis in a camera coordinate system. To transform the coordinate values of the world coordinate system into the coordinate values of a camera image, calculation by the following equations (1) and (2) is generally required. First, coordinate values (Xw, Yw, Zw) of the world coordinate system are transformed into coordinate values (Xc, Yc, Zc) of the camera coordinate system by $$\begin{pmatrix} Xc \\ Yc \\ Zc \end{pmatrix} = R \begin{pmatrix} Xw \\ Yw \\ Zw \end{pmatrix} + t \quad (1)$$

wherein a rotation matrix R is determined by the orientation of the camera in the world coordinate system, and a translation vector t is determined by the position of the camera in the world coordinate system. Note that the rotation matrix R is a 3×3 matrix.

Next, the three-dimensional coordinate point (Xc, Yc, Zc) of the camera coordinate system is transformed into a two-dimensional coordinate point (u, v) on a camera image by perspective projection transformation by $$\begin{pmatrix} u \\ v \end{pmatrix} = \begin{pmatrix} Xc/Zc \\ Yc/Zc \end{pmatrix} \quad (2)$$

As described above, in order to obtain a coordinate point of the camera coordinate system from a coordinate point of the world coordinate system, nine multiplications are required in the equation (1) and two divisions are required in the equation (2). In this manner, multiplication and division are required for each of the x-, y-, and z-coordinates in order to transform a three-dimensional coordinate point into a coordinate point on a camera image, thereby increasing the cost.

SUMMARY OF THE INVENTION

According to one aspect of the present invention, there is provided an information processing apparatus that generates a three-dimensional model based on a plurality of camera images obtained using a plurality of cameras, comprising: a transformation unit configured to transform, into two-dimensional coordinate points on a camera image, a plurality of representative coordinate points specified from one processing unit voxel of a plurality of processing unit voxels that are obtained by dividing a target three-dimensional space serving as a target of three-dimensional model generation; a determination unit configured to determine, by using transformation results of the plurality of representative coordinate points by the transformation unit, a coordinate point on the camera image corresponding to an internal coordinate point of the one processing unit voxel; and a generation unit configured to generate the three-dimensional model based on the coordinate point on the camera image corresponding to the internal coordinate point of the one processing unit voxel determined by the determination unit.

According to another aspect of the present invention, there is provided a generation method of generating a three-dimensional model based on a plurality of camera images obtained using a plurality of cameras, the method comprising: transforming, into two-dimensional coordinate points on a camera image, a plurality of representative coordinate points specified from one processing unit voxel of a plurality of processing voxels that are obtained by dividing a target three-dimensional space serving as a target of three-dimensional model generation; determining, by using transformation results of the plurality of representative coordinate points, a coordinate point on the camera image corresponding to an internal coordinate point of the one processing unit voxel; and generating the three-dimensional model based on the coordinate point on the camera image corresponding to the internal coordinate point of the one processing unit voxel that have been determined.

Further features of the present invention will become apparent from the following description of exemplary embodiments with reference to the attached drawings.

BRIEF DESCRIPTION OF THE DRAWINGS

FIG. 1B is a block diagram showing an example of the hardware arrangement of the three-dimensional model generation apparatus;

FIG. 5 is a view exemplifying the results of transforming representative coordinate points of a processing unit voxel into coordinate points on a camera image;

FIG. 7 is a flowchart for expressing voxel determination processing;

DESCRIPTION OF THE EMBODIMENTS

Embodiments of the present invention will be described hereinafter with reference to the accompanying drawings.

First Embodiment

A three-dimensional model generation apparatus according to the first embodiment generates, by the volume intersection method, a three-dimensional model based on a silhouette image of a target object to be modeled for each camera. In the first embodiment, when transforming the three-dimensional coordinate points of each voxel into corresponding pixel coordinate points on a silhouette image of each camera, the calculation load is reduced by performing projective transformation on each representative coordinate point and obtaining each remaining arbitrary coordinate point by approximate calculation. Note that in this embodiment, a voxel indicates a unit of division of a target three-dimensional space that is to be shot by a plurality of cameras. Each voxel may be a cube, a cuboid, or another shape.

Figure 1A:
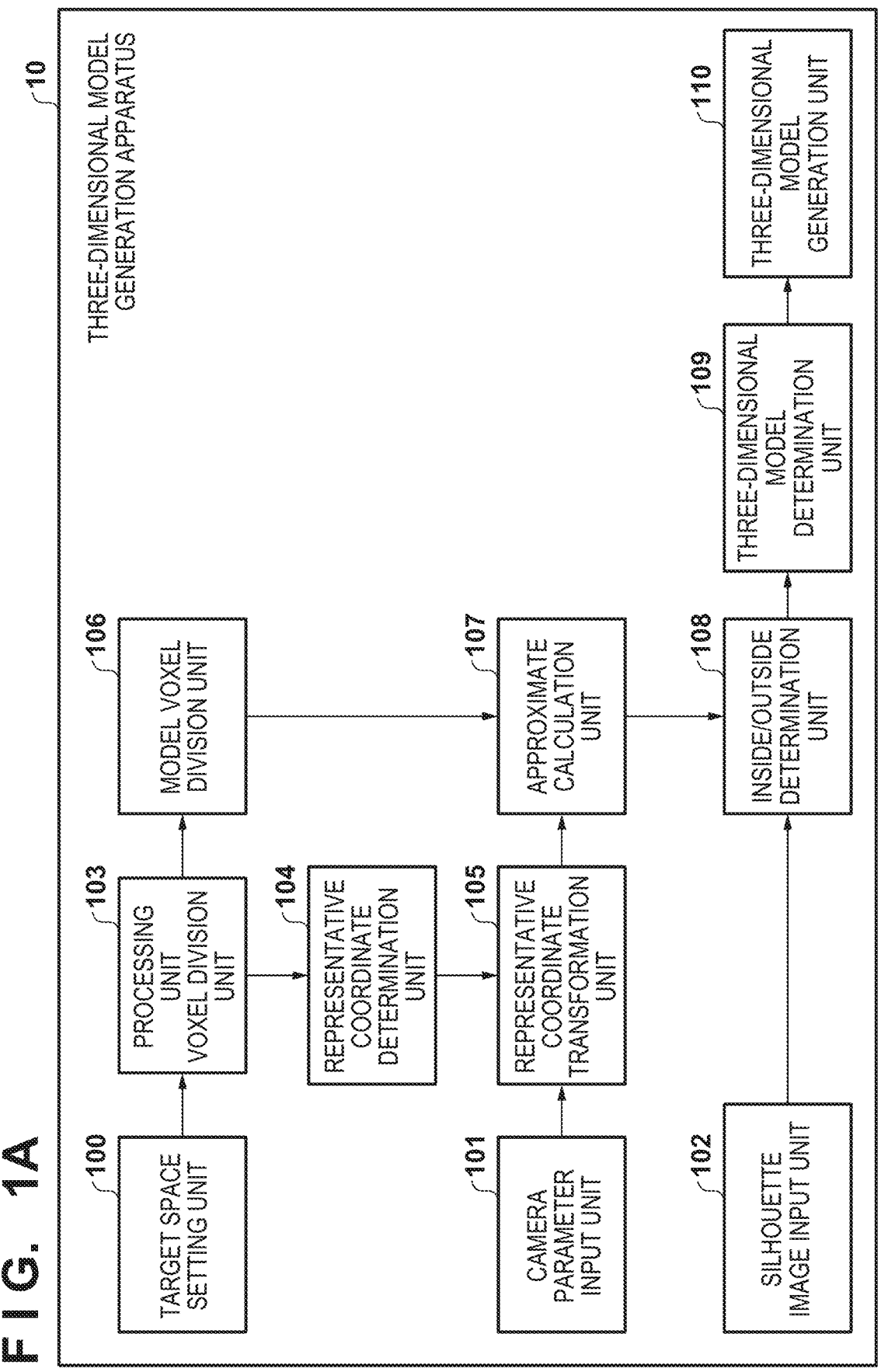
FIG. 1A is a block diagram showing an example of the functional arrangement of a three-dimensional model generation apparatus according to the first embodiment.
Figure 2:
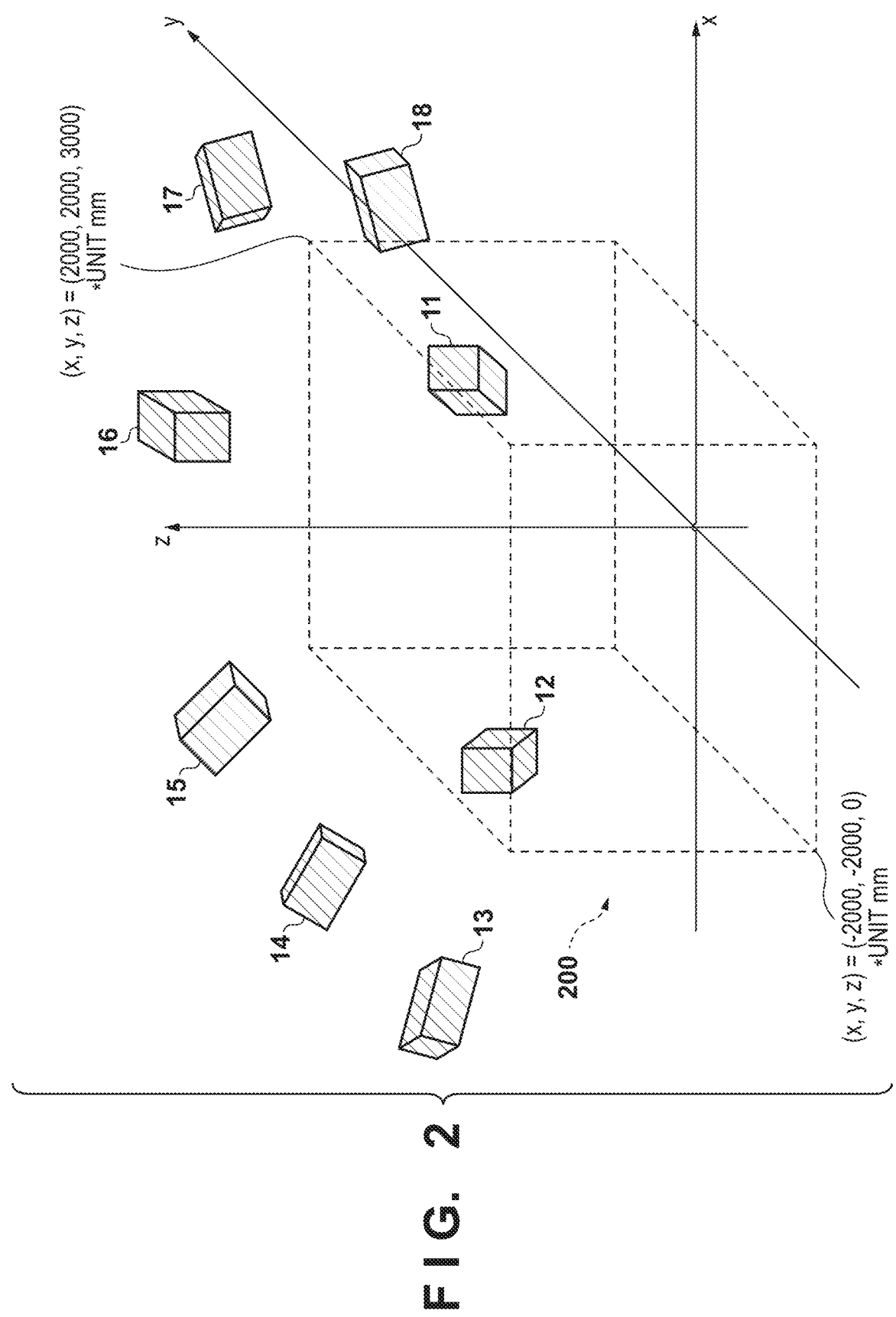
FIG. 2 is a view showing an example of a system for obtaining input data.

FIG. 1A is a block diagram showing an example of the functional arrangement of a three-dimensional model generation apparatus 10 according to the first embodiment. FIG. 1B is a block diagram showing an example of the hardware arrangement of an information processing apparatus serving as the three-dimensional model generation apparatus 10. FIG. 2 is a view for explaining a shooting system for obtaining input data of the three-dimensional model generation apparatus 10 according to the first embodiment.

As shown in FIG. 2, a plurality of cameras 11 to 18 capture images of a space including the target space for three-dimensional model generation. The image data obtained by processing each camera image obtained by image capturing and the information of each camera are used as input data of the three-dimensional model generation apparatus 10. Note that in FIG. 2, although eight cameras are shown as the plurality of cameras, the number of cameras is not limited to this. Details of the input data will be described later.

As shown in FIG. 1B, the three-dimensional model generation apparatus 10 according to this embodiment is formed by an information processing apparatus. A general-purpose computer can be used as the information processing apparatus. A CPU 21 controls the overall information processing apparatus by executing a program stored in a ROM 22 or a RAM 23. For example, the CPU 21 implements each function as the three-dimensional model generation apparatus 10 (to be described later) by loading a predetermined program stored in a storage device 25 to the RAM 23 and executing the program loaded to the RAM 23. The ROM 22 is a read only non-volatile memory. The RAM 23 is a memory that is readable and writable as needed. A display device 24 performs various kinds of display under the control of the CPU 21.

The storage device 25 is a large-capacity storage device formed from, for example, a hard disk or the like. The storage device 25 can store the camera images obtained by the cameras 11 to 18. An input device 26 accepts various kinds of user inputs to the information processing apparatus. An interface 27 is an interface for connecting to an external apparatus, and the plurality of cameras are connected to this interface in this embodiment. Note that the cameras 11 to 18 may be connected via a network such as a LAN. In this case, the interface 27 functions as a network interface. A bus 28 communicably connects the above-described components to each other. Note that in this embodiment, although each function of the three-dimensional model generation apparatus 10 to be described below is implemented by the CPU 21 executing a predetermined program, it is not limited to this. For example, each function of the three-dimensional model generation apparatus 10 may be implemented by cooperation between software and hardware such as a dedicated IC. Alternatively, some or all of the functions may be implemented by hardware only.

FIG. 1A shows an example of the functional arrangement of the three-dimensional model generation apparatus 10 that generates a three-dimensional model based on a plurality of camera images obtained by using the plurality of cameras. In FIG. 1A, a target space setting unit 100 sets a three-dimensional space (target three-dimensional space) that is to be the target of three-dimensional model generation. For example, in FIG. 2, a cuboid ranging from −2000 mm to 2000 mm of the x-axis, −2000 mm to 2000 mm of the y-axis, and 0 mm to 3000 mm of the z-axis has been set as the target three-dimensional space. However, the size of the target three-dimensional space is not limited to this. The coordinate system expressing the coordinates of the set three-dimensional space is called a world coordinate system. The coordinate range information of the set three-dimensional space is output to a processing unit voxel division unit 103. Note that a user determines a target three-dimensional space by designating a range that can be captured by a plurality of cameras in a system for obtaining input data. However, it may be set so that a target three-dimensional space is determined automatically.

A camera parameter input unit 101 inputs parameters from each of the cameras 11 to 18, which shot the target three-dimensional space, and outputs the camera parameters to a representative coordinate transformation unit 105. Here, camera parameters are a set of parameters formed by including the three-dimensional position of a camera in the world coordinate system, an optical-axis direction vector, a camera screen lower direction vector, a focal length, and the image center. However, all of the aforementioned parameters need not be always included in each set of camera parameters. For example, only the three-dimensional position of the camera and the optical-axis direction vector (or the orientation information of the camera) can be obtained as the camera parameters.

Figure 3:
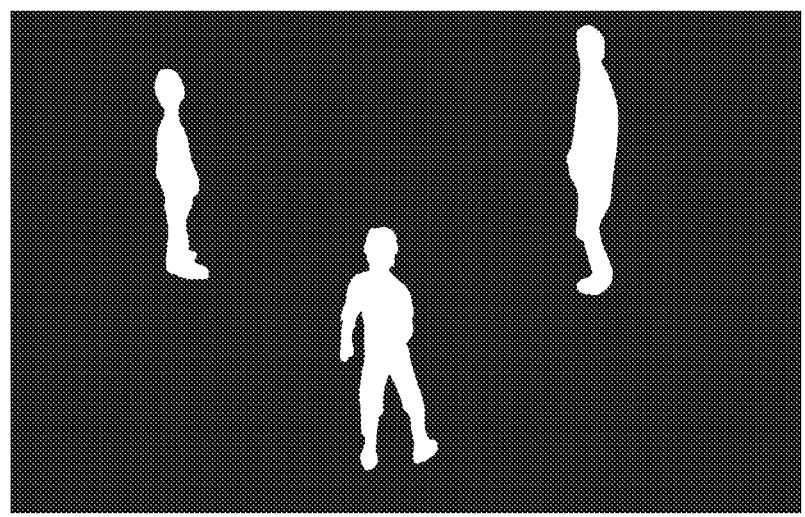
FIG. 3 is a view showing an example of a silhouette image.

A silhouette image input unit 102 inputs the silhouette image of each camera image. A silhouette image is an image identifying an object region and a region other than the object region by expressing the object region to be the target of model generation by using white pixels and expressing a background region other than the object region by using black pixels. However, the arrangement of the white pixels and the black pixels of the object region and the background region, respectively, is not limited to this and may be reversed. The silhouette image exemplified in FIG. 3 has been obtained by processing a camera image in which three people are present into a silhouette image. As a method of generating a silhouette image from a camera image, there is, for example, a background subtraction method in which the object region and the background region are identified by comparing an image shot when an object is not present and an image shot when the object is present. The method of generating a silhouette image is not limited to this, as a matter of course. A method of detecting an object region by obtaining a correlation using a plurality of images captured at different times, an edge extraction method, or the like can be used.

The processing unit voxel division unit 103 divides the space set by the target space setting unit 100 into a plurality of processing unit voxels. The information of each processing unit voxel is output to a representative coordinate determination unit 104 and a model voxel division unit 106. Here, the information of each processing unit voxel includes the smallest x-, y-, and z-vertex coordinates and the length of each side. However, in this embodiment, assume that the length of each side is set with the same value in all of the processing unit voxels and that each side of a processing unit voxel is arranged to be parallel to one of the x-, y-, and z-axes. The size of each processing unit voxel may be a preset size or may be determined in accordance with the size of the target three-dimensional space or the voxel size of each voxel which is to form the three-dimensional model to be ultimately output. Each voxel that forms this three-dimensional model which is to be ultimately output is referred to as a model voxel. In this embodiment, assume that the processing unit voxel is determined in accordance with the size of each model voxel which is to be output.

Figure 4:
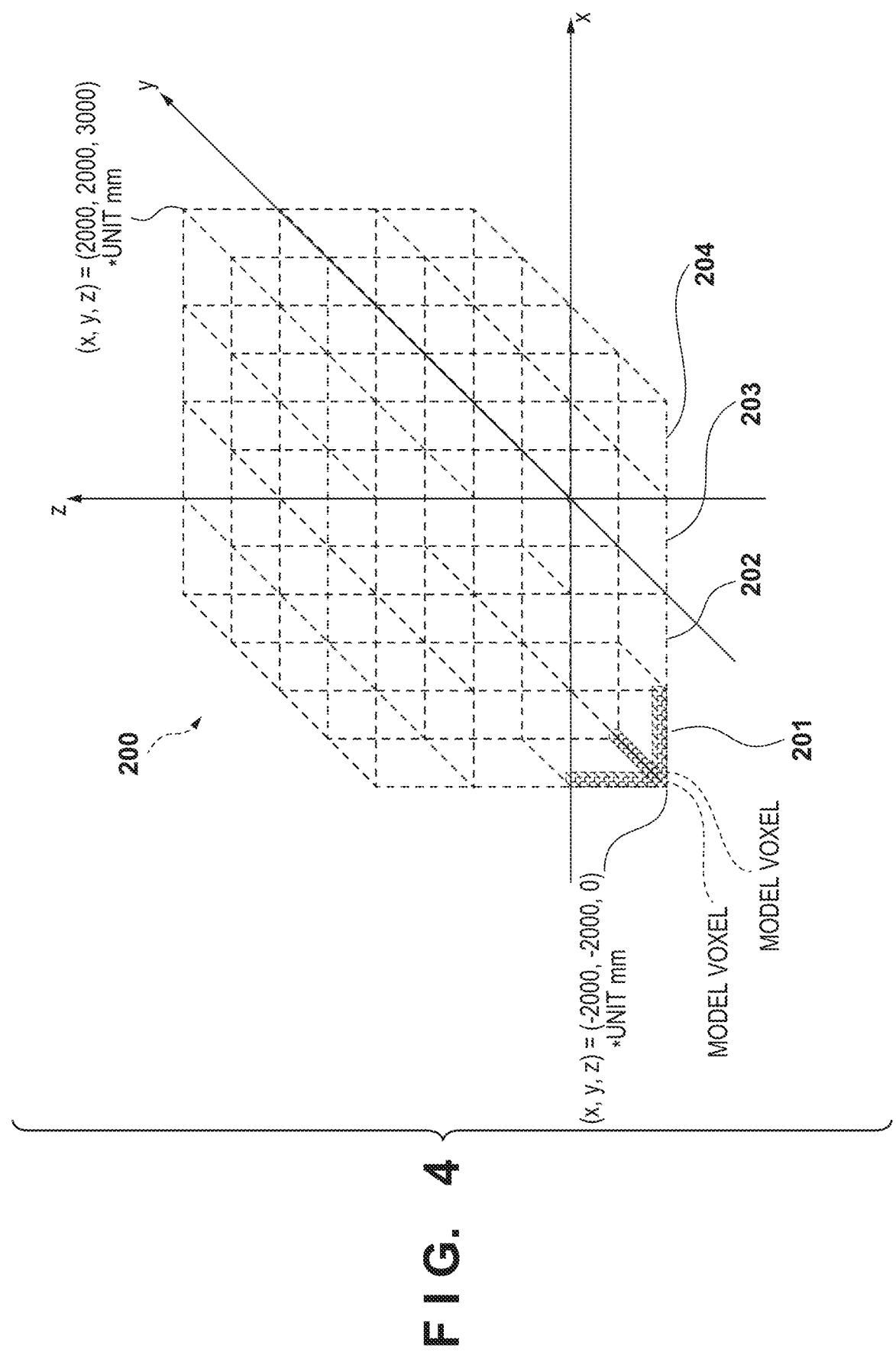
FIG. 4 is a schematic view expressing a target three-dimensional space, processing unit voxels, and model voxels.

FIG. 4 is a schematic view expressing the target three-dimensional space set by the target space setting unit 100, the processing unit voxels, and the model voxels. In FIG. 4, the target three-dimensional space is divided into a processing unit voxel 201 and the like. Here, each processing unit voxel is a voxel in which the length of each side is 1000 mm, and the set target three-dimensional space is divided into quarters in the x-axis and y-axis directions and divided into thirds in the z-axis direction. Note that, however, the division count of the processing unit voxels is not limited to this.

The representative coordinate determination unit 104 specifies, in each processing unit voxel, a plurality of representative coordinate points to be used for transforming the three-dimensional coordinate points of the target space into coordinate points on a camera image. As will be described below, an approximate calculation unit 107 calculates transformation coefficients for transforming movement amounts in the respective axis directions of the target three-dimensional space into movement amounts in the camera image. Hence, representative coordinate points are obtained so as to include a pair of coordinate points in which only the x-coordinates differ, a pair of coordinate points in which only the y-coordinates differ, and a pair of coordinate points in which only the z-coordinates differ. In this embodiment, the following four points of a processing unit voxel are selected as the representative coordinate points.

(1) A point with the smallest x-, y-, and z-values.
(2) A point with the smallest y- and z-values and the largest x-value.
(3) A point with the smallest x- and z-values and the largest y-value.
(4) A point with the smallest x- and y-values and the largest z-value.

Although this embodiment has described an example in which four points are selected among the vertices of the processing unit voxel, other points can be selected as well. For example, it may be set so that the four points are selected by using the center of gravity of the processing unit voxel instead of the vertices of the processing unit voxel, but it is not limited to this. The determined representative coordinate points are output to the representative coordinate transformation unit 105.

The representative coordinate transformation unit 105 transforms, based on the camera parameters, the input representative coordinate points (coordinate points in the target three-dimensional space) of the processing unit voxel into coordinate points (two-dimensional coordinate points) of a camera image shot by each camera. Note that a coordinate system expressing the target three-dimensional space will be represented as a world coordinate system hereinafter. In FIG. 2, each coordinate point in the world coordinate system of the target three-dimensional space is represented by coordinate values ranging from (−2000, −2000, 0) and (2000, 2000, 3000). Assume that the aforementioned camera parameters indicate the position and the orientation of each camera in the world coordinate system. The representative coordinate transformation unit 105 calculates coordinate points of the plurality of representative coordinate points in the target three-dimensional space by matrix calculation and perspective projection transformation.

First, the representative coordinate transformation unit 105 transforms coordinate values (Xw, Yw, Zw) of the world coordinate system into coordinate values (Xc, Yc, Zc) of the camera coordinate system by using a rotation matrix R and a translation vector t derived from the camera parameters. The above-described equation (1) can be used for this transformation. Next, the representative coordinate transformation unit 105 transforms the three-dimensional coordinate point (Xc, Yc, Zc) of the camera coordinate system into a two-dimensional coordinate point (u, v) of a camera image by perspective projection transformation. The above-described equation (2) can be used for this transformation. The representative coordinate transformation unit 105 outputs each representative coordinate point and the information of the corresponding transformed coordinate point in the camera image to the approximate calculation unit 107.

The model voxel division unit 106 divides each processing unit voxel into model voxels of a three-dimensional model that has been set in advance. The model voxels are also arranged to be parallel to the x-, y-, and z-axes in the same manner as the processing unit voxels. Each processing voxel is filled with the model voxels without any gaps between the model voxels. That is, the processing voxel is divided into model voxels without any gaps. The model voxel division unit 106 outputs the voxel group information after the division to the approximate calculation unit 107. The voxel group information includes the smallest x-, y-, and z-vertex coordinates, the length of each side of the voxel, and the size of each side of each model voxel.

FIG. 4 shows how the processing unit voxel 201, which is a 1000 mm cube, is divided into model voxels, each of which is a 100 mm cube. Hence, one processing unit voxel is divided into a total of 1000 model voxels. Note that although all of the model voxels have not been described for the sake of descriptive convenience in FIG. 4, all of the regions of the processing unit voxels will be divided into the model voxels in practice.

Based on the positional relationships of the plurality of representative coordinate points changing from the positional relationships in the target three-dimensional space to the positional relationships in a camera image, the approximate calculation unit 107 performs approximate calculation of determining the coordinate points in the camera image that correspond to the internal coordinate points of one processing voxel. The approximate calculation according to this embodiment will be described hereinafter.

The approximate calculation unit 107 calculates, based on the representative coordinate points and the information of the corresponding coordinate points in a camera image that have been received from the representative coordinate transformation unit 105, the transformation coefficients between the movement amounts of the three-dimensional coordinate points in the world coordinate system and pixel movement amounts in a camera image. The transformation coefficients are calculated targeting every camera that is to shoot the target space. FIG. 5 is a view exemplifying the results of transforming the representative coordinate points of a processing unit voxel into coordinate points on a camera image. A method of calculating the transformation coefficient between each of the movement amounts of three-dimensional coordinate points in the world coordinate system and each of the pixel movement amounts in a camera image will be described with reference to FIG. 5 hereinafter. In this embodiment, the approximate calculation unit 107 calculates, from the transformation results of the plurality of representative coordinate points, the transformation coefficient of the movement amount from a u-coordinate to a v-coordinate in a camera image for each of the movement amounts of the x-, y-, and z-coordinates in the target three-dimensional space. The approximate calculation unit 107 uses each of the calculated transformation coefficients to calculate (to approximate) the coordinate point in the camera image that corresponds to the arbitrary coordinate point in the target three-dimensional space. This operation will be described in detail below.

In FIG. 5, assume that the result obtained from transforming a representative coordinate point 300 of a processing unit voxel is a transformed coordinate point 400 on the camera image. Hereinafter, assume that a representative coordinate point 301 corresponds to a transformed coordinate point 401, a representative coordinate point 302 corresponds to a transformed coordinate point 402, and a representative coordinate point 303 corresponds to a transformed coordinate point 403. In the case of the representative coordinate point 300 (X1, Y1, Z1) and the coordinate values (X2, Y1, Z1) of the representative coordinate point 301, only the values of the x-axis differ from each other, and the values of the y-axis and the z-axis are the same. The difference between the coordinate values of the transformed coordinate point 401 (ux, vx) and that of the transformed coordinate point 400 (ub, vb) is a difference generated from movement in the x-axis direction in the three-dimensional space. Hence, the relationship between the movement amount in the x-axis direction in the three-dimensional space and the coordinate points on the camera image can be calculated. Pixel movement amounts dux and dvx on the camera image for each 1 mm of the movement amount on the x-axis in the three-dimensional space are calculated by $$dux = \frac{(ux - ub)}{(X2 - X1)} \quad (3)$$

$$dvx = \frac{(vx - vb)}{(X2 - X1)} \quad (4)$$

In the same manner, pixel movement amounts duy and dvy on the camera image for each 1 mm of the movement amount on the y-axis in the three-dimensional space are calculated from the coordinate values of the representative coordinate point 300 and the representative coordinate point 302 and the coordinate values of the transformed coordinate point 400 and the transformed coordinate point 402 by $$duy = \frac{(uy - ub)}{(Y2 - Y1)} \quad (5)$$

$$dvy = \frac{(vy - vb)}{(Y2 - Y1)} \quad (6)$$

In the same manner, pixel movement amounts duz and dvz on the camera image for each 1 mm of the movement amount on the z-axis in the three-dimensional space are calculated from the coordinate values of the representative coordinate point 300 and the representative coordinate point 303 and the coordinate values of the transformed coordinate point 400 and the transformed coordinate point 403 by $$duz = \frac{(uz - ub)}{(Z2 - Z1)} \quad (7)$$

$$dvz = \frac{(vz - vb)}{(Z2 - Z1)} \quad (8)$$

These calculation results are used to transform an arbitrary coordinate point 304 (X, Y, Z of the target three-dimensional space into a transformed coordinate point 404 (u, v) which is coordinate point on the camera image by $$u = ub + (dux \times (X-X1)) + (duy \times (Y-Y1)) + (duz \times (Z-Z1)) \quad (9)$$

$$v = vb + (dvx \times (X-X1)) + (dvy \times (Y-Y1)) + (dvz \times (Z-Z1)) \quad (10)$$

where (X, Y, Z) is a coordinate point satisfying (X1≤X≤X2), (Y1≤X≤Y2), and (Z1≤Z≤Z2).

According to this method, although the calculation cost of calculating the pixel movements will increase in comparison to that of the conventional art, it is possible to perform transformation by three multiplications. By using results obtained from performing calculations using the representative coordinate points of the processing unit voxel for coordinate transformation of the plurality of model voxels present in the processing unit voxel, it is possible to reduce a cost of six multiplications and two divisions from the calculation of each coordinate point, thus resulting in a large cost reduction overall. The approximate calculation unit 107 performs the above-described calculation and transforms the coordinate values of eight vertices of each model voxel, serving as positions related to the model voxel, into coordinate points in each camera image. Subsequently, the approximate calculation unit outputs the coordinate values of each camera image to an inside/outside determination unit 108. Note that the method of transforming the coordinate points in a voxel is not limited to the above-described approximate calculation, and various kinds of modifications are applicable. That is, the transformation method can be set so that coordinate points in the camera image are derived from the coordinate points in a voxel of the target three-dimension image based on the positional relationships of the representative coordinate points of the voxel in the target three-dimensional space and the positional relationships of the representative coordinate points of the voxel in the camera image.

Figure 6A:
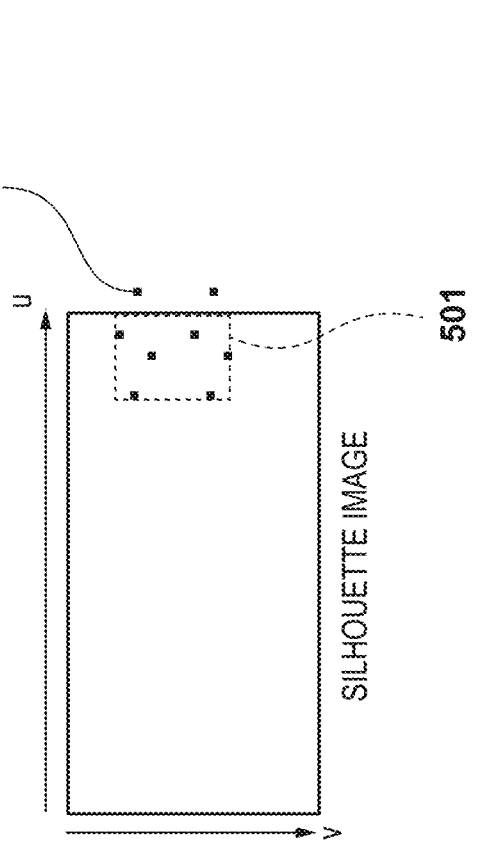
FIGS. 6A to 6C are views each showing the transformation of the vertices of a voxel into pixel coordinate points on a silhouette image and a search area.
Figure 6B:
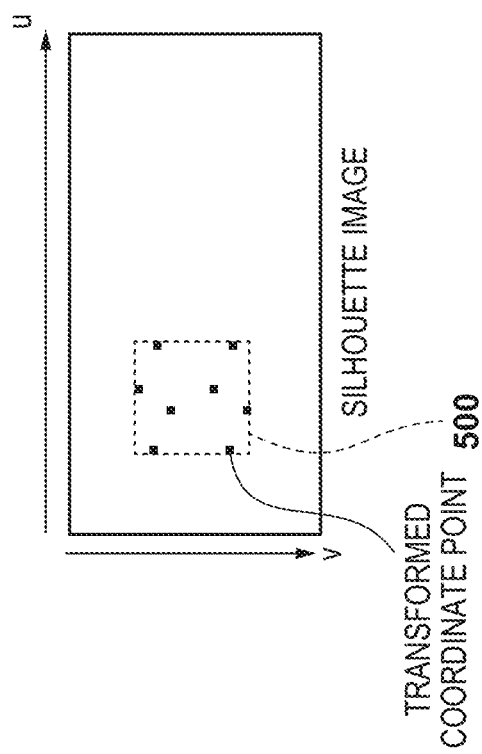
Figure 6C:
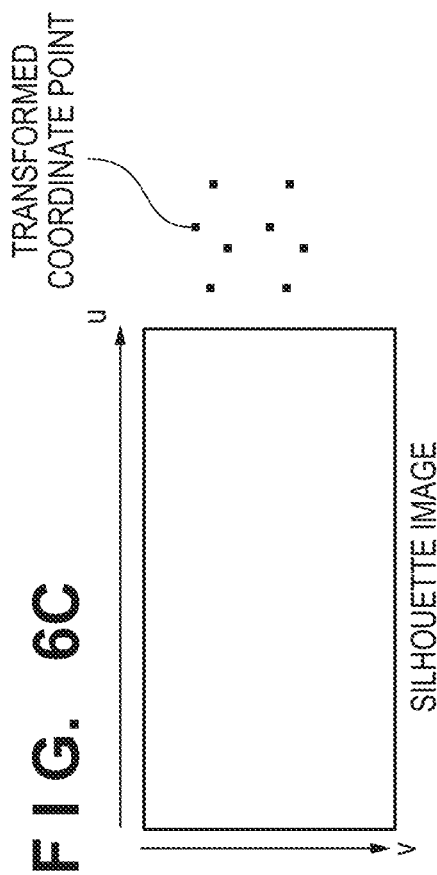

The inside/outside determination unit 108 determines whether a model voxel in each camera image is within the silhouette of the model generation target object. FIGS. 6A to 6C are views exemplifying the results from transforming the eight vertices of each model voxel to silhouette images. The inside/outside determination unit 108 compares the transformed coordinate points and extracts the largest u- and v-coordinate point and the smallest u- and v-coordinate point. A rectangular region that includes the largest u- and v-coordinate point and the smallest u- and v-coordinate point is set as the search region of a silhouette image. In FIG. 6A, the inside/outside determination unit 108 sets a search region 500 from the coordinate points related to the model voxel. The inside/outside determination unit 108 searches whether a white pixel (silhouette pixel) is present in this search region 500. If a white pixel is present, the inside/outside determination unit determines that the model voxel is inside the silhouette. If a white pixel is not present, the model voxel is determined to be outside the silhouette.

Note that if some of the transformed coordinate points are outside the silhouette image, as shown in FIG. 6B, the inside/outside determination unit 108 determines a search region 501 by using the largest coordinate values of the silhouette image. Also, if all of the transformed coordinate points are outside the silhouette image, as shown in FIG. 6C, the inside/outside determination unit 108 excludes the search area as a determination target since the coordinate points are outside the image capturing range of the camera. Subsequently, the inside/outside determination unit 108 counts the cameras that are determined to be inside the silhouette and the cameras that are determined to be outside the silhouette for that model voxel. The number of cameras inside the silhouette and the number of cameras outside the silhouette are output, as the determination result, to a three-dimensional model determination unit 109.

Note that although a method of performing inside/outside silhouette determination by using the eight vertices of each model voxel in the approximate calculation unit 107 and the inside/outside determination unit 108 have been described, the method is not limited to this. For example, the inside/outside silhouette determination may be performed by using only one model voxel coordinate point, transforming the one coordinate point into a camera image, and determining whether the coordinate point of the camera image is a white pixel. In this case, one predetermined coordinate point among the vertices of the model voxel may be used or the center of gravity of the model voxel may be used as the one predetermined coordinate point.

The three-dimensional model determination unit 109 determines, based on the result of inside/outside silhouette determination by the inside/outside determination unit 108, whether the target model voxel is a voxel forming the model. The three-dimensional model determination unit outputs, to a three-dimensional model generation unit 110, the coordinate values of the model voxel which has been determined to be a voxel forming the model.

Model voxel determination processing performed by the three-dimensional model determination unit 109 according to the first embodiment will be described below in accordance with the flowchart of FIG. 7.

First, the three-dimensional model determination unit 109 determines whether the total number of cameras that are determined be outside the silhouette is equal to or more than a first threshold (step S700). If it is determined that the number of cameras outside the silhouette is equal to or more than the first threshold (YES in step S700), the three-dimensional model determination unit 109 determines that the model voxel is not a voxel forming the three-dimensional model (step S701). On the other hand, if it is not determined that that the number of cameras outside the silhouette is equal to or more than the first threshold (NO in step S700), the three-dimensional model determination unit 109 determines whether the number of cameras that are determined to be inside the silhouette is equal to or more than a threshold (step S702). If the number of cameras determined to be inside the silhouette is less than the threshold (NO in step S702), the three-dimensional model determination unit 109 determines that the model voxel is not a voxel forming the three-dimensional model (step S701). If the number of cameras determined to be inside the silhouette is equal to or more than the threshold (YES in step S701), the three-dimensional model determination unit 109 determines that the model voxel is a voxel forming the three-dimensional model (step S703).

In this embodiment, one is set as the first threshold for the number of cameras determined to be outside the silhouette in step S700, and two is set as the second threshold for the number of cameras determined to be inside the silhouette in step S702. However, the first and second thresholds are not limited those described above. For example, the thresholds may be set in accordance with the shooting environment and the number of cameras. Also in the determination as to whether a model voxel is a voxel forming the three-dimensional model, it may be set so that only the number of cameras determined to be inside the silhouette will be used or it may be set so that only the number of cameras determined to be outside the silhouette will be used.

The three-dimensional model generation unit 110 outputs the coordinate values of the voxel that has been determined by the three-dimensional model determination unit 109 to be a model voxel forming the model. In this embodiment, assume that an aggregate of points is used as the output format and that the coordinate values of each point indicate the center-of-gravity coordinate point of a model voxel. Also, assume that the coordinate representation expresses the numerical values of the x-, y-, and z-coordinates in mm. Note that although the center of gravity of a model voxel has been used as the coordinate values of the model voxel to be output, but it is not limited to this. For example, one of the vertices of the model voxel may be used. Also, the unit of coordinate representation is not limited to mm. Furthermore, although an aggregate of points has been assumed as an output format here, a format such as a mesh model or a polygon may also be used.

Figure 8A:
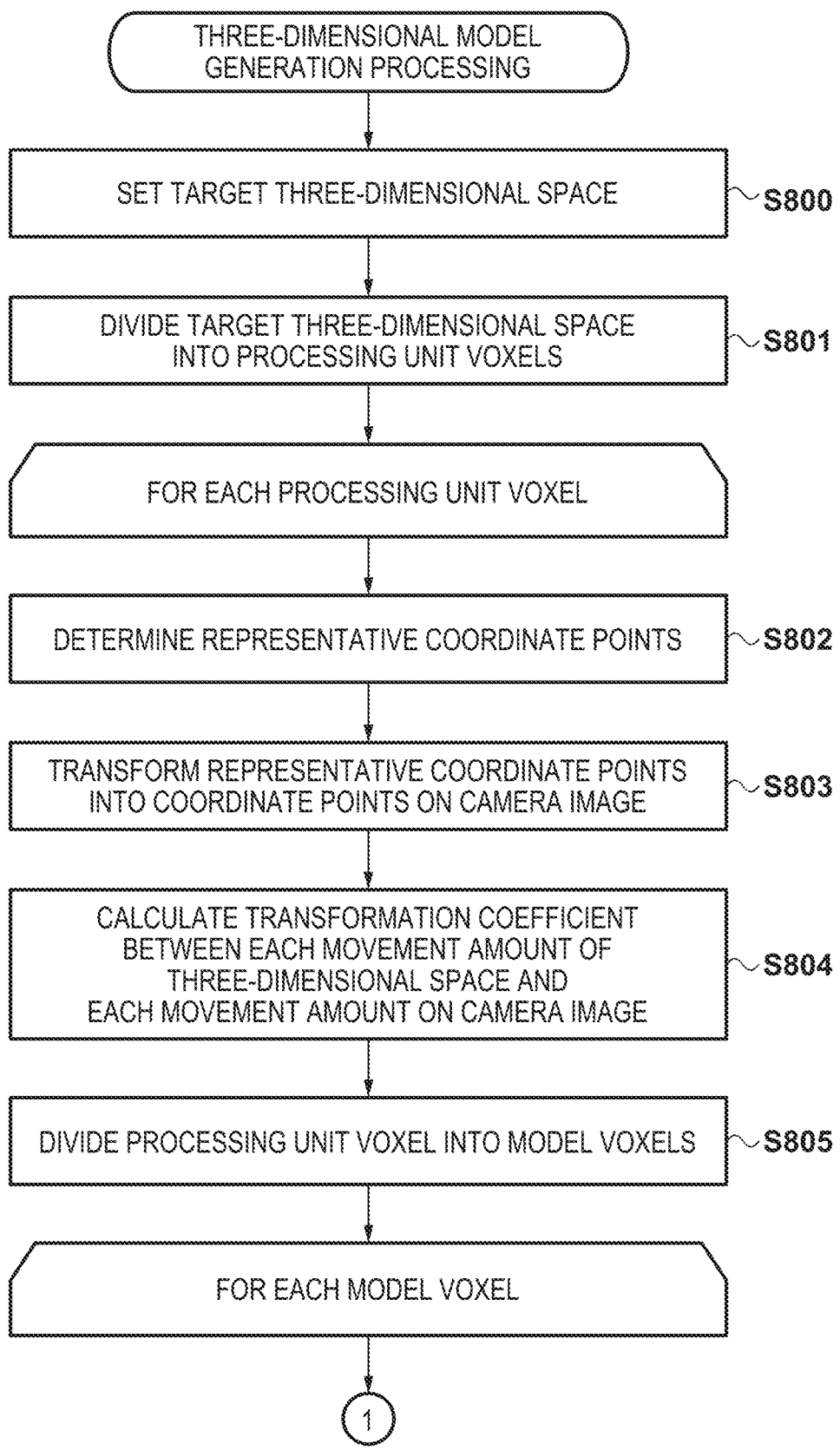
FIGS. 8A and 8B are flowcharts for expressing three-dimensional model generation processing.
Figure 8B:
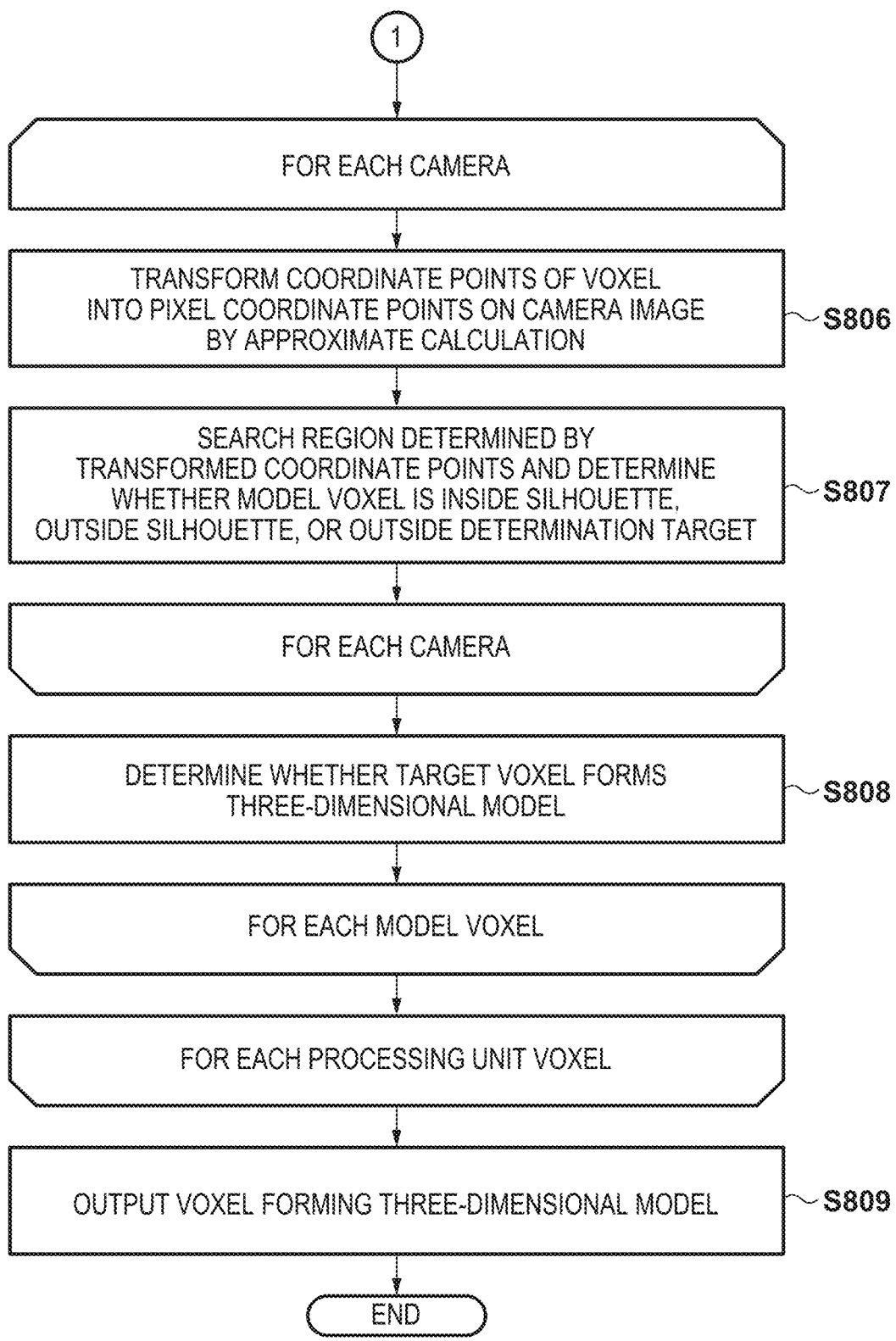

The three-dimensional model generation processing performed by the three-dimensional model generation apparatus 10 will be described below in accordance with the flowcharts of FIGS. 8A and 8B.

First, the target space setting unit 100 sets the target three-dimensional space for model generation (step S800). The processing unit voxel division unit 103 divides the set target three-dimensional space into processing unit voxels and inputs the processing unit voxels to the representative coordinate determination unit 104 and the model voxel division unit 106 (step S801). The processes of steps S802 to S808 are executed for each processing voxel hereinafter.

The representative coordinate determination unit 104 determines the representative coordinate points of each processing voxel and outputs the determined representative coordinate points to the representative coordinate transformation unit 105 (step S802). The representative coordinate transformation unit 105 transforms, calculating the equations (1) and (2), the representative coordinate points into the coordinate points of each camera image and outputs the representative coordinate points and the information of the transformed coordinate points in each camera image to the approximate calculation unit 107 (step S803). The approximate calculation unit 107 calculates, by calculating the equations (3) to (8), the transformation coefficients between the movement amounts of the three-dimensional coordinate points in the world coordinate system and the pixel movement amounts in each camera image from the representative coordinate points and the information of the transformed coordinate points in each camera image (step S804). The model voxel division unit 106 divides the processing unit voxel into model voxels and outputs the information of the divided model voxels to the approximate calculation unit 107 (step S805).

The processes of steps S806 to S808 are executed for each model voxel, for all of the model voxels. Also, the processes of steps S806 and step S807 of the above processes are performed for each camera, for all of the cameras. The approximate calculation unit 107 calculates, of the coordinate points of the model voxel, each transformed coordinate point on a camera image by the approximate calculation indicated in (9) and (10) (step S806). The inside/outside determination unit 108 performs, for each camera, inside/outside silhouette determination by searching for a search region determined from the coordinate points on the camera image after the transformation. The inside/outside determination unit outputs the number of cameras that are determined to be inside the silhouette and the number of cameras that are determined to be outside the silhouette to the three-dimensional model determination unit 109 (step S807). The three-dimensional model determination unit 109 determines, based on the result from the inside/outside silhouette determination of the model voxel, whether the model voxel is a model voxel that forms the three-dimensional model (step S808). The three-dimensional model generation unit 110 outputs the model voxel, which has been determined to form the model and serves as an aggregate of points, as the three-dimensional model (step S809).

As described above, according to the first embodiment, when the three-dimensional coordinate points of each model voxel are to be transformed into pixel coordinate points on a silhouette image of each camera, only the representative coordinate points of a processing unit voxel undergo projective transformation, and the other coordinate points are obtained by approximate calculation. As a result, the calculation load can be greatly reduced. According to the first embodiment, for example, in the volume intersection method, when the three-dimensional coordinate points are transformed into coordinate positions on a camera image, only the representative coordinate points undergo projective transformation and the coordinate positions on the camera image are obtained by approximate calculation for each remaining three-dimensional coordinate point. Therefore, it is possible to reduce the calculation load when constructing a three-dimensional model by the volume intersection method.

Second Embodiment

When the approximate calculation method described in the first embodiment is used, the calculation error becomes large compared to that of the matrix calculation as shown by the equations (1) and (2). The influence of this calculation error on the accuracy of the three-dimensional model to be generated can increase depending on the size of each processing unit voxel and the size of each model voxel. The larger the size of the processing unit voxel is with respect to the model voxel, the larger the calculation error is, thereby increasing the influence of the calculation error on the accuracy of the three-dimensional model. On the other hand, the smaller the processing unit voxel is with respect to the model voxel, the fewer the number of times in which the transformation coefficients calculated from the transformation results of the representative coordinate points can be applied to the approximate calculation is, thereby reducing the effect of the increased processing speed. In some cases, the load of calculating the transformation coefficients may become heavier, and this may slow down the processing speed compared to that of a case in which normal matrix calculation is performed.

In the second embodiment, whether to execute coordinate transformation by approximate calculation or by matrix calculation is determined, in consideration of the influence from a calculation error and the effect of the increased processing speed, in accordance with the size of each processing unit voxel and each model voxel which is ultimately output. That is, according to the second embodiment, whether to perform coordinate transformation by approximate calculation or matrix calculation is suitably switched in accordance with the size of a voxel to be processed.

Figure 9:
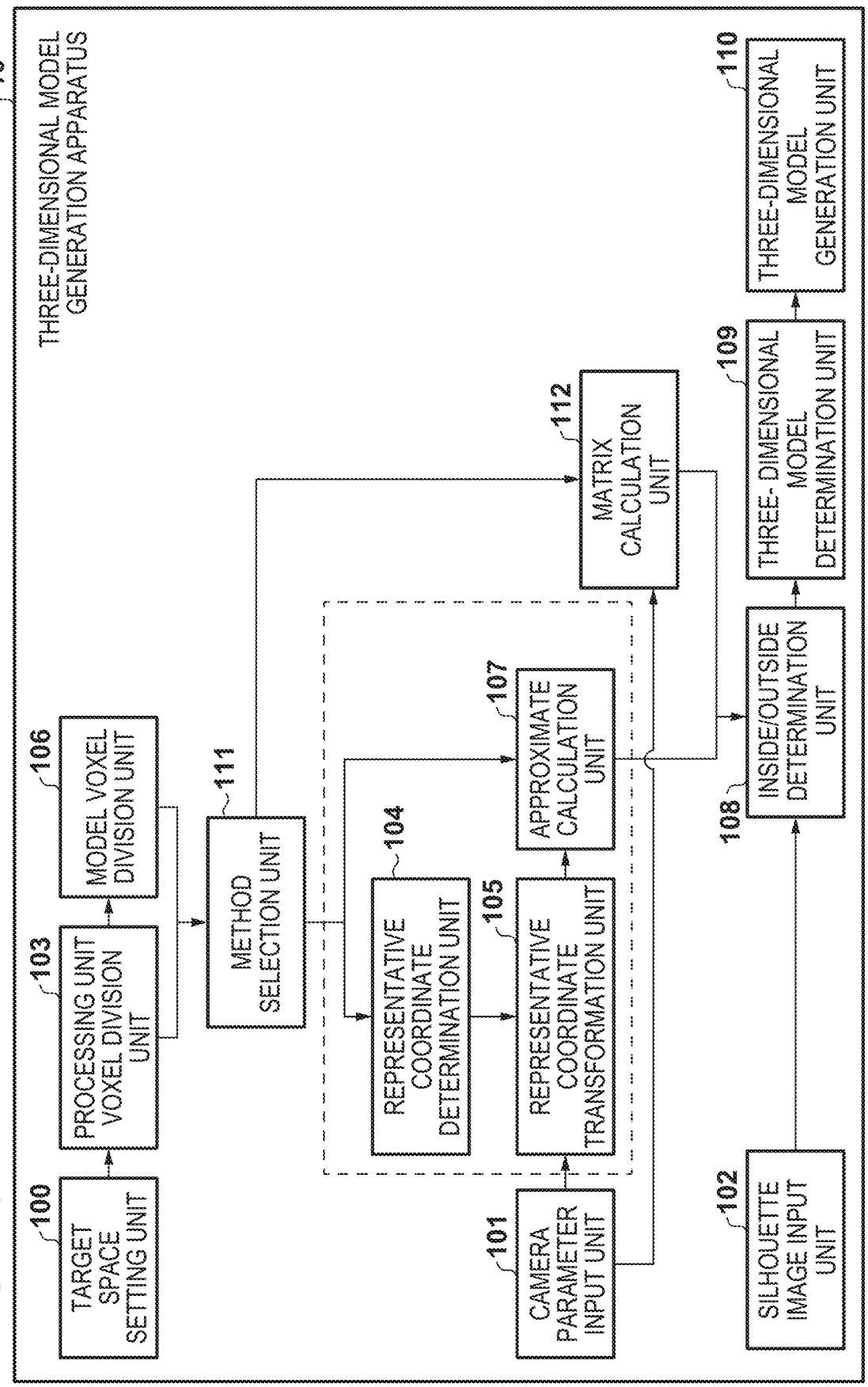
FIG. 9 is a block diagram showing an example of the functional arrangement of a three-dimensional model generation apparatus according to the second embodiment.

FIG. 9 is a block diagram showing an example of the functional arrangement of a three-dimensional model generation apparatus 10 according to the second embodiment. Blocks having the same functions as those of the first embodiment (FIG. 1A) are denoted by the same reference numerals.

In FIG. 9, a method selection unit 111 obtains the information of a processing unit voxel from the processing unit voxel division unit 103 and the information of a model voxel from the model voxel division unit 106. The method selection unit 111 selects, in accordance with the ratio between the size of the processing unit voxel and the size of the model voxel, to execute coordinate transformation by approximate calculation or by matrix calculation which allows an accurate transformation result to be obtained. The details of the selection method will be described later.

If the method selection unit 111 selects to execute approximate calculation, the information of the processing unit voxel is output to a representative coordinate determination unit 104 and the information of the model voxel is output to the approximate calculation unit 107. On the other hand, if the method selection unit 111 selects to execute matrix calculation, the information of the model voxel is output to a matrix calculation unit 112.

The matrix calculation unit 112 obtains the camera parameters of each camera from a camera parameter input unit 101, obtains the information of the model voxel from the method selection unit 111, and transforms, by calculating the equations (1) and (2), the coordinate points of the respective eight vertices of the model voxel into coordinate points on each camera image. That is, the matrix calculation unit 112 executes matrix calculation of transforming the coordinate points of a target three-dimensional space into coordinate points on a camera image by matrix transformation and perspective projection transformation. The matrix calculation unit 112 outputs the converted coordinate values to an inside/outside determination unit 108. After coordinate transformation, in the same manner as the first embodiment, inside/outside silhouette determination by the inside/outside determination unit 108 and model voxel determination by a three-dimensional model determination unit 109 are performed, and the three-dimensional model is generated by a three-dimensional model generation unit 110.

Next, the selection of a coordinate transformation method (approximate calculation or matrix calculation) by the method selection unit 111 will be described. The method selection unit 111 according to this embodiment selects one of the approximate calculation and the matrix calculation based on the relationship between the size of the processing unit voxel and the size of the model voxel. More specifically, if the ratio between the size of the processing unit voxel and the size of the model voxel is within an upper threshold and a lower threshold that are preset, the approximate calculation is selected. If the ratio between the size of the processing unit voxel and the size of the model voxel is larger than the upper threshold or smaller than the lower threshold, the method selection unit 111 selects the matrix calculation.

As described above, if the difference between the sizes of the voxels is large, the calculation error will be large. Hence, since the calculation error will be large in a case in which the aforementioned ratio exceeds the upper threshold, the matrix calculation is selected. If the difference between the sizes of the voxels is small, the effect of increased processing speed by the approximate calculation will be small, and this may, on the contrary, increase the load in some cases. Hence, even in a case in which the aforementioned ratio is lower than the lower threshold, the matrix calculation is selected.

Note that although the second embodiment showed a method in which an upper threshold and a lower threshold are used, it may be arranged so that only one of the upper threshold and the lower threshold is set as a threshold, and the calculation method may be selected based on whether the ratio exceeds this threshold. Also, the calculation method may be selected based on whether the size of the processing unit voxel or the size of the model voxel is larger than a predetermined size. It can be set so that, for example, with respect to the size of an object forming the three-dimensional model which is to be the target, approximate calculation is used in a case in which the processing unit voxel is equal to or smaller than a predetermined size, for example, ¼ of the size of the object, and so that the matrix calculation is used of other cases. However, the ratio in this case is not limited to that described above.

As described above, according to the second embodiment, in a case in which the calculation error by approximate calculation is small or in a case in which the effect of increased processing speed is large, coordinate transformation can be performed by approximate calculation. That is, the approximate calculation and the matrix calculation can be used suitably, and it is possible to generate a three-dimensional model with high accuracy and high speed.

Third Embodiment

In the first embodiment, a transformation coefficient is determined based on the assumption that the movement amount in each axis direction in a world coordinate system is equally reflected on the movement amount in each axis direction in a camera image. In the third embodiment, a higher-accuracy approximate calculation is performed by considering the deformation of an object region when a target three-dimensional space is projected on a camera image. More specifically, the change in the length of each line segment in a camera image when a predetermined line segment is moved parallel between representative coordinate points in the target three-dimensional space is added to each transformation coefficient of the first embodiment. Note that the arrangement of a three-dimensional model generation apparatus 10 according to the third embodiment is the same as that of the first embodiment (FIG. 1A). However, the operations of a representative coordinate determination unit 104 and an approximate calculation unit 107 are different from those of the first embodiment.

Figure 10:
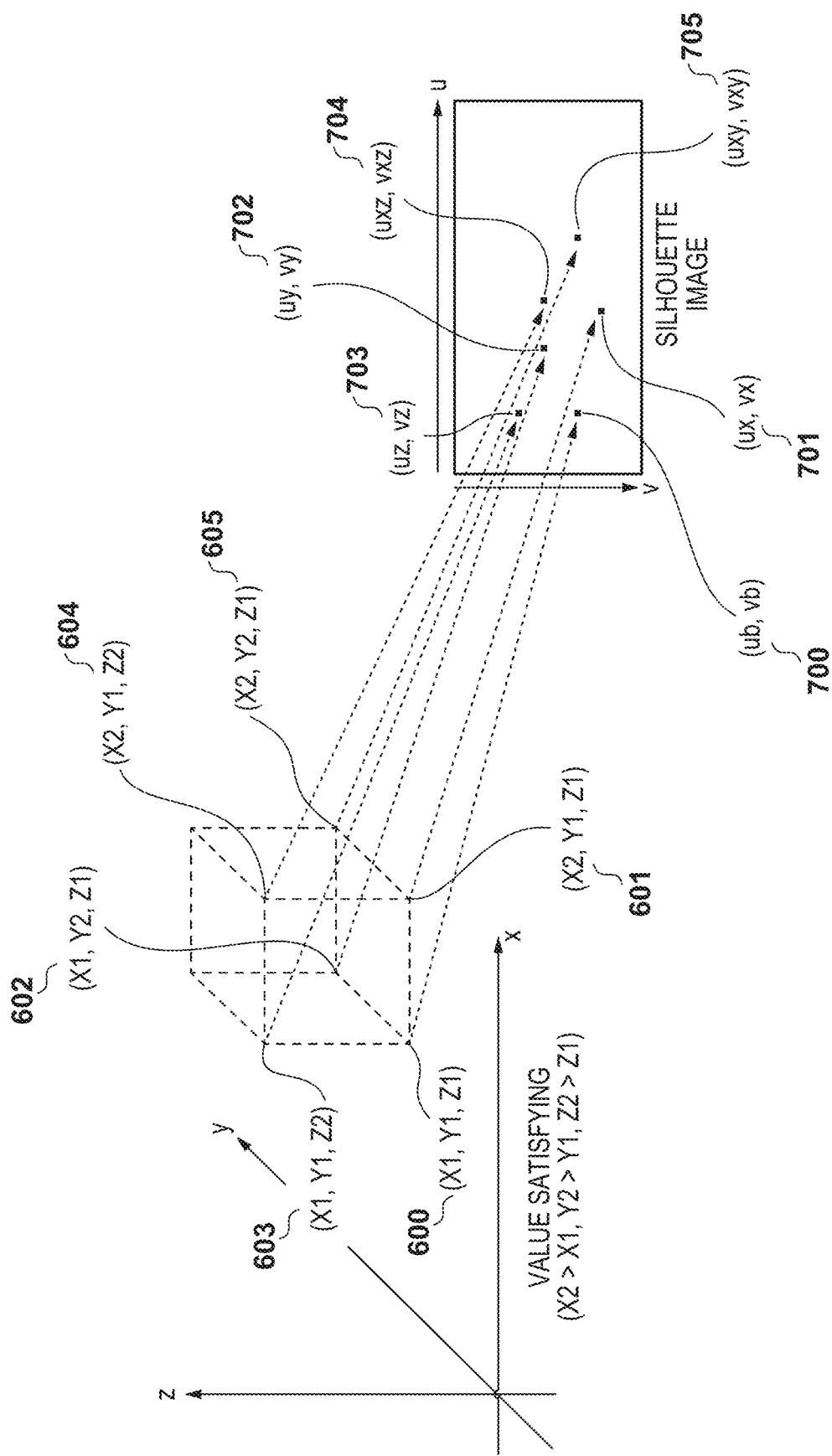
FIG. 10 is a view exemplifying the results of transforming representative coordinate points of a processing unit voxel into coordinate points on a camera image.

FIG. 10 is a view exemplifying the results from transforming representative coordinate points of a processing unit voxel into coordinate points on a camera image according to the third embodiment. In the first embodiment, the representative coordinate determination unit 104 determined four points, among the vertices of the processing unit voxel, as the representative coordinate points. In the third embodiment, the representative coordinate determination unit 104 determines, among the vertices of the processing unit voxel, the following six points as the representative coordinate points.

(1) A point with the smallest x-, y-, and z-values (a representative coordinate point 600 and a transformed coordinate point 700 in FIG. 10).

(2) A point with the smallest y- and z-values and the largest x-value (a representative coordinate point 601 and a transformed coordinate point 701 in FIG. 10).

(3) A point with the smallest x- and z-values and the largest y-value (a representative coordinate point 602 and a transformed coordinate point 702 in FIG. 10).

(4) A point with the smallest x- and y-values and the largest z-value (a representative coordinate point 603 and a transformed coordinate point 703 in FIG. 10).

(5) A point with the smallest y-value and the largest x- and z-values (a representative coordinate point 604 and a transformed coordinate point 704 in FIG. 10).

(6) A point with the smallest z-value and the largest x- and y-values (a representative coordinate point 605 and a transformed coordinate point 705 in FIG. 10).

Here, although six points have been selected from the vertices of the processing unit voxel, it is not limited to this. It is sufficient to determine the representative coordinate points so as to include a group of four coordinate points that have the same x-coordinate, a group of four coordinate points that have the same y-coordinate, and a group of four coordinate points that have the same z-coordinate. Additionally, the representative coordinate points are not limited to the coordinate points of the vertices of the processing unit voxel.

Figure 11A:
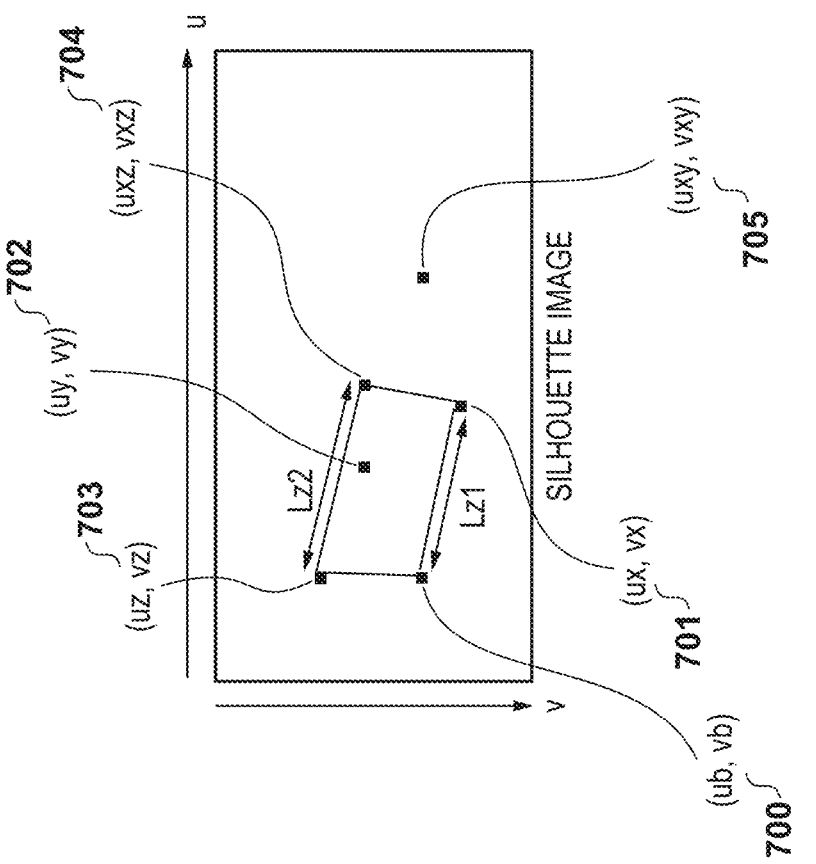
FIGS. 11A and 11B are views each showing coordinate points in the camera image and distances between the coordinate points that are used for approximate calculation.
Figure 11B:
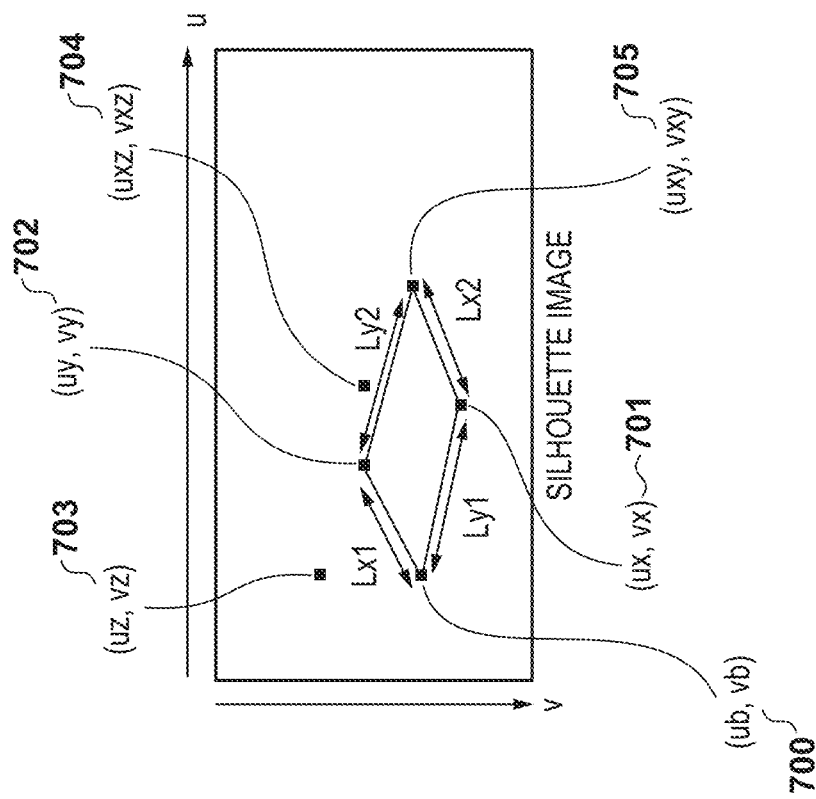

FIGS. 11A and 11B are views each showing coordinate points on a camera image used for approximate calculation and distances between the respective coordinate points. The approximate calculation unit 107 calculates, from the transformation results of the representative coordinate points, distances Lx1, Lx2, Ly1, Ly2, Lz1, and Lz2 between the coordinate points shown in FIGS. 11A and 11B. The approximate calculation unit 107 transforms an arbitrary coordinate point of the three-dimensional coordinate points into a coordinate point of the camera image by using the following calculations.

In FIG. 11A, assume that the distance between the transformed coordinate point 700 and the transformed coordinate point 702 is Lx1 and that the distance between the transformed coordinate point 701 and the transformed coordinate point 705 is Lx2. By using the distance between these coordinate points, movement amounts dux and dvx on the camera image when moving from the representative coordinate point 600 of the processing unit voxel for a distance dx in the x-axis direction in the three-dimensional space are calculated by $$dux = (ux - ub) \times dx \times \frac{Lx1}{(Lx1 \times dx) + (Lx2 \times (X2 - X1 - dx))} \quad (11)$$

$$dvx = (vx - vb) \times dx \times \frac{Lx1}{(Lx1 \times dx) + (Lx2 \times (X2 - X1 - dx))} \quad (12)$$

In addition, in FIG. 11A, assume that the distance between the transformed coordinate point 700 and the transformed coordinate point 701 is Ly1 and that the distance between the transformed coordinate point 702 and the transformed coordinate point 705 is Ly2. Movement amounts duy and dvy on the camera image when moving from the representative coordinate point 600 of the processing unit voxel for a distance dy in the y-axis direction in the three-dimensional space are calculated by $$duy = (uy - ub) \times dy \times \frac{Ly1}{(Ly1 \times dy) + (Ly2 \times (Y2 - Y1 - dy))} \quad (13)$$

$$dvy = (vy - vb) \times dy \times \frac{Ly1}{(Ly1 \times dy) + (Ly2 \times (Y2 - Y1 - dy))} \quad (14)$$

Furthermore, in FIG. 11B, assume that the distance between the transformed coordinate point 700 and the transformed coordinate point 701 is Lz1 and that the distance between the transformed coordinate point 703 and the transformed coordinate point 704 is Lz2. Movement amounts duz and dvz on the camera image when moving from the representative coordinate point 600 of the processing unit voxel for a distance dz in the z-axis direction in the three-dimensional space are calculated by $$duz = (uz - ub) \times dz \times \frac{Lz1}{(Lz1 \times dz) + (Lz2 \times (Z2 - Z1 - dz))} \quad (15)$$

$$dvz = (vz - vb) \times dz \times \frac{Lz1}{(Lz1 \times dz) + (Lz2 \times (Z2 - Z1 - dz))} \quad (16)$$

The results of these calculations can be used to transform an arbitrary coordinate point 304 (X, Y, Z) of the target three-dimensional space into a coordinate point (u, v) on the camera image by $$u = ub + dux + duy + duz \quad (17)$$

$$v = vb + dvx + dvy + dvz \quad (18)$$

where X=X1+dx, Y=Y1+dy, and Z=Z1+dz.

As described above, according to the third embodiment, compared to the first embodiment, since approximate calculation of coordinate transformation is performed by adding the degree of deformation after the transformation of the three-dimensional coordinate points, a higher-accuracy coordinate transformation can be performed. That is, compared to the first embodiment, the quality of the three-dimensional model to be generated improves.

Note that the second embodiment can be applied so that whether to use the approximate calculation or the matrix calculation of the third embodiment is selected based on the size of the processing unit voxel and the size of the model voxel. Also, in each of the above-described embodiments, after processing in a model voxel is completed, it is possible to set the model voxel as a processing unit voxel, further divide the model voxel, and repetitively perform processing. According to the above described embodiments, it is possible to reduce the calculation load at the time of three-dimensional model generation.

Although the embodiments of the present invention have been described above, the present invention is not limited to the above-described embodiments, and various modifications and changes can be made within the spirit and scope of the present invention described in the appended claims. For example, the approximate calculation unit 107 can calculate a two-dimensional coordinate point of a non-representative coordinate point by performing linear interpolation to the two-dimensional coordinate point on a camera image of the representative coordinate point. This allows a three-dimensional model to be generated with a lighter load. It may also be set so that the user can designate a specific method among the plurality of approximate calculation methods described in the aforementioned embodiments. As a result, it will be possible to implement three-dimensional model generation suited to the desired three-dimensional model accuracy and the calculation resource amount.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-028423, filed Feb. 17, 2017 which is hereby incorporated by reference herein in its entirety.

What is claimed is:

1. An information processing apparatus comprising:
one or more memories storing instructions; and
one or more processors executing the instructions to:
   (a) transform, into two-dimensional coordinates on a plurality of images obtained using a plurality of image capturing apparatuses, three-dimensional coordinates of a plurality of representative points in a three-dimensional space serving as a target of three-dimensional model generation;
   (b) transform, into two-dimensional coordinates on the plurality of images, three-dimensional coordinates of a non-representative point that exists in the three-dimensional space and that is different from the plurality of representative points, based on (i) transformation results of the plurality of representative points, (ii) positions of the plurality of representative points on the three-dimensional space, and (iii) a position of the non-representative point on the three-dimensional space, wherein the three-dimensional coordinates of the non-representative point are transformed by interpolation of the transformation results of the plurality of representative points; and
   (c) generate a three-dimensional model based on (i) the plurality of images, (ii) the transformation results of the plurality of representative points, and (iii) transformation results of the non-representative point.

2. The apparatus according to claim 1, wherein the three-dimensional coordinates of the non-representative point are transformed based on (i) positional relationships of the plurality of representative points in the three-dimensional space and (ii) positional relationships of the plurality of representative points in the image.

3. The apparatus according to claim 1, wherein the three-dimensional coordinates of the non-representative point are transformed by linear interpolation of the transformation results of the plurality of representative points.

4. The apparatus according to claim 1, wherein the one or more processors further executes the instructions to:
   (a) obtain a silhouette image to identify an object region corresponding to the three-dimensional model; and
   (b) determine, based on (i) the silhouette image, (ii) the transformation results of the plurality of representative points, and (iii) the transformation results of the non-representative point, whether a model voxel including at least one of the plurality of representative points forms the object region of the three-dimensional model and whether a model voxel including the non-representative point forms the object region of the three-dimensional model, wherein the three-dimensional model is generated based on the determination result.

5. The apparatus according to claim 1, wherein the three-dimensional coordinates of the plurality of representative points are transformed by matrix transformation and perspective projection transformation.

6. The apparatus according to claim 1, wherein the three-dimensional coordinates of the non-representative point are transformed by using a transformation coefficient that is used to transform each of movement amounts of an x-coordinate, y-coordinate, and a z-coordinate in the three-dimensional space into movement amounts of a u-coordinate and a v-coordinate on the image.

7. The apparatus according to claim 6, wherein the plurality of representative points include a pair of points in which only the x-coordinates differ, a pair of points in which only the y-coordinates differ, and a pair of points in which only the z-coordinates differ.

8. The apparatus according to claim 7, wherein the plurality of representative coordinate points are formed from four points.

9. The apparatus according to claim 6, wherein the transformation coefficient is calculated based on a change in a length of a line segment on the image in a case where the line segment of a predetermined length is moved parallel between the plurality of representative points in the three-dimensional space.

10. The apparatus according to claim 9, wherein the plurality of representative points include a group of four coordinate points that have the same x-coordinate, a group of four points that have the same y-coordinate, and a group of four points that have the same z-coordinate.

11. The apparatus according to claim 10, wherein the plurality of representative points are formed from six points.

12. The apparatus according to claim 1, wherein the plurality of representative points are formed from points of a plurality of vertices of one processing unit voxel forming the three-dimensional space.

13. The apparatus according to claim 1, wherein the three-dimensional coordinates of the non-representative point are transformed based on (i) the relationship between the representative point and the two-dimensional coordinates where the plurality of representative points are transformed, and (ii) the relationship between the positions of the plurality of representative points on the three-dimensional space and the position of the non-representative point on the three-dimensional space.

14. The apparatus according to claim 1, wherein the three-dimensional model is generated based on (i) the plurality of images, (ii) the relationship between the plurality of representative points and the two-dimensional coordinates where the plurality of representative points are transformed, and (iii) the relationship between the non-representative point and the two-dimensional coordinates where the non-representative point is transformed.

15. The apparatus according to claim 1, wherein the one or more processors further execute the instructions to select one of a first method and a second method, based on the relationship between (i) a size of a one processing unit voxel forming the three-dimensional space and (ii) a size of a model voxel forming the one processing unit voxel, wherein the first method comprises matrix transformation and perspective projection transformation, and wherein the second method comprises interpolation of the transformation results of the plurality of representative points, and
   wherein the three-dimensional coordinates of the non-representative point are transformed based on the selected method.

16. The apparatus according to claim 15, wherein the first method is selected in a case where a ratio of the size of the model voxel to the size of the one processing unit voxel exceeds an upper threshold or in a case where the ratio is lower than a lower threshold which is smaller than the upper threshold, and
   wherein the second method is selected in other cases.

17. The apparatus according to claim 1, wherein at least one of the plurality of representative points is within a voxel forming the three-dimensional space, and the non-representative point is within another voxel forming the three-dimensional space.

18. A generation method of generating a three-dimensional model, the method comprising:

transforming, into two-dimensional coordinates on a plurality of images obtained using a plurality of image capturing apparatuses, three-dimensional coordinates of a plurality of representative points in a three-dimensional space serving as a target of three-dimensional model generation;

transforming, into two-dimensional coordinates on the plurality of images, three-dimensional coordinates of a non-representative point that exists in the three-dimensional space and that is different from the plurality of representative points, based on (i) transformation results of the plurality of representative points, (ii) positions of the plurality of representative points on the three-dimensional space, and (iii) a position of the non-representative point on the three-dimensional space, wherein the three-dimensional coordinates of the non-representative point are transformed by interpolation of the transformation results of the plurality of representative points; and generating the three-dimensional model based on (i) the plurality of images, (ii) the transformation results of the plurality of representative points, and (iii) transformation results of the non-representative point.

19. A non-transitory computer-readable storage medium storing a program for causing a computer to execute a generation method of generating a three-dimensional model, the method comprising:

transforming, into two-dimensional coordinates on a plurality of images obtained using a plurality of image capturing apparatuses, three-dimensional coordinates of a plurality of representative points in a three-dimensional space serving as a target of three-dimensional model generation;

transforming, into two-dimensional coordinates on the plurality of images, three-dimensional coordinates of a non-representative point that exists in the three-dimensional space and that is different from the plurality of representative points, based on (i) transformation results of the plurality of representative points, (ii) a position of the plurality of representative points on the three-dimensional space, and (iii) a position of the non-representative point on the three-dimensional space, wherein the three-dimensional coordinates of the non-representative point are transformed by interpolation of the transformation results of the plurality of representative points; and generating the three-dimensional model based on (i) the plurality of images, (ii) the transformation results of the plurality of representative points, and (iii) transformation results of the non-representative point.

* * * * *